May 29, 1951 W. D. HERSHBERGER 2,555,131

FREQUENCY STABILIZING SYSTEM

Filed Nov. 4, 1948 3 Sheets-Sheet 1

INVENTOR
William D. Hershberger
BY J. L. Whittaker
ATTORNEY

INVENTOR
William D. Hershberger
BY J. L. Whittaker
ATTORNEY

INVENTOR
William D. Hershberger
BY J. L. Whittaker
ATTORNEY

Patented May 29, 1951 2,555,131

UNITED STATES PATENT OFFICE 2,555,131

FREQUENCY STABILIZING SYSTEM

William D. Hershberger, Princeton, N. J., assignor to Radio Corporation of America, a corporation of Delaware Application November 4, 1948, Serial No. 58,296

17 Claims. (Cl. 250—36)

This invention relates to the stabilization of the carrier frequency of oscillators, particularly frequency-modulated microwave oscillators, by methods and systems involving scanning of a range of frequencies including a reference frequency and the oscillator frequency or a harmonic thereof.

With such methods and systems as previously employed, the rate of search and the width of the scanned frequency range are necessarily compromises. In brief, the repetition rate of the scanning should be lower than the lowest modulation rate to avoid effect of the modulation upon the stabilizing control but such low repetition rate inherently limits the quantity of error information obtainable in a given interval of time. For precise control, the scanned band of frequencies should be narrow but since, as previously stated, the error information is collected at low rate, the operating frequency may shift out of the control range before correction is applied or may not come within the control range. In consequence, it has heretofore been necessary to use a low scanning rate and a wide scanning range to avoid effect of modulation upon the stabilizing control and to insure operativeness of the control for large deviations from the desired operating frequency.

A principal object of the present invention is to overcome these inherent limitations of such methods and systems, particularly as applied to frequency-modulated oscillators, by modifications and improvements insuring precise control of the carrier frequency over an extended range of frequency-deviation.

Generally in accordance with the present invention, coarse stabilization of frequency is effected by collection of error information based upon comparison at high repetition rate of the oscillator frequency with the frequency of a low Q standard.

This information is rapidly utilized to stabilize the oscillator frequency within fairly broad frequency limits. Concurrently with the foregoing, there is collected additional error-information based upon comparison at low repetition rate of the oscillator frequency with the frequency of a high Q standard and such additional information is more slowly utilized to stabilize the oscillator at a precise frequency within the range of coarse stabilization.

More particularly, in one form of the invention, the two stabilizing systems are generally similar in that each comprises a sweep oscillator, a cell containing gas-exhibiting molecular resonance, and a phase comparator or coincidence detector. In one of the stabilizing systems, the sweep oscillator has a high repetition rate, the gas cell has a low effective Q and the phase detector has an effectively short-time constant for rapid collection and utilization of error information. In the other of the stabilizing systems, the sweep oscillator has a low repetition rate, the gas cell has a high effective Q and the phase detector has an effectively long time-constant for slower collection and utilization of additional error information.

In other forms of the invention, one of the stabilizing systems is similar to those above described but the other stabilizing system is dissimilar in that the molecular resonant frequency of the gas standard is varied by the Stark effect or the Zeeman effect for collection of error information.

The invention further resides in methods and systems having features hereinafter described and claimed.

For a more complete understanding of the invention and for illustration of systems embodying it, reference is made to the accompanying drawings in which:

Figure 1 schematically illustrates a dual-stabilizing system for a microwave generator;

Figures 1, 2, 3, 4:
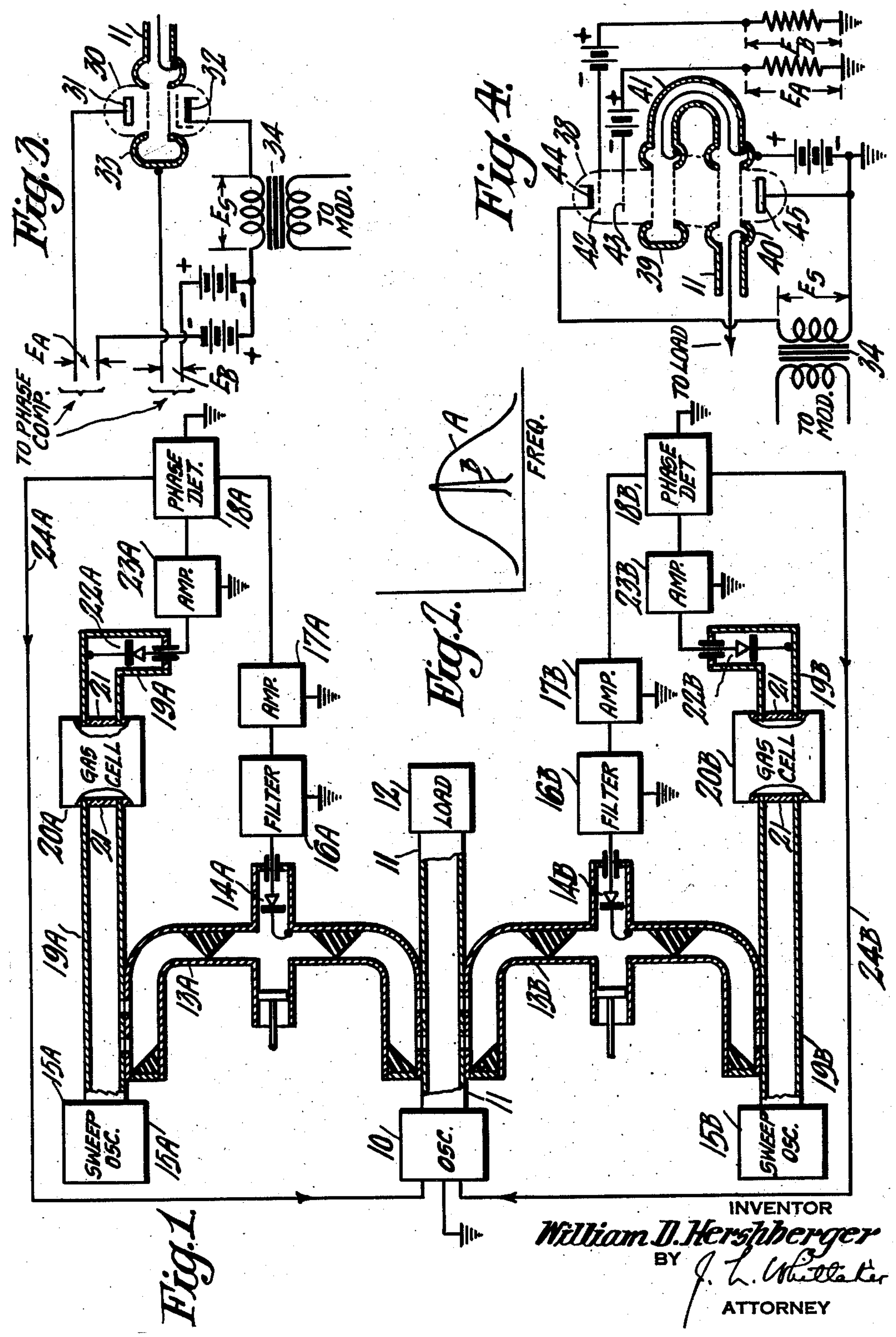
Figure 2 is an explanatory figure referred to in discussion of Figure 1.
Figure 3 illustrates application of frequency control voltages to a reflex Klystron.
Figure 4 illustrates application of frequency control voltages to a multi-cavity Klystron.
Figures 5, 6, 7:
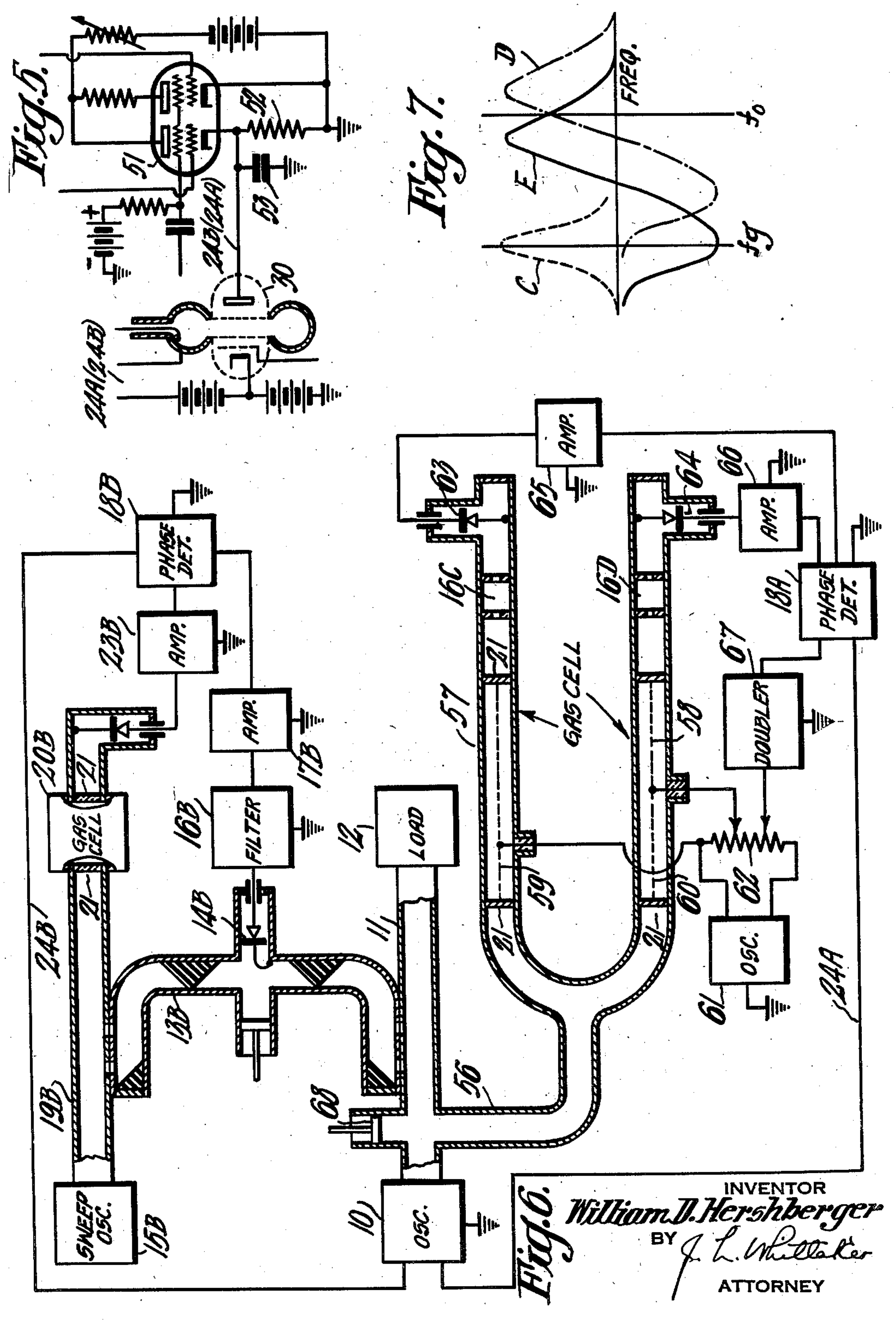
Figure 5 illustrates one form of output circuit for phase-detectors of the system of Figure 1.
Figures 8, 9A, 9B, 9C:
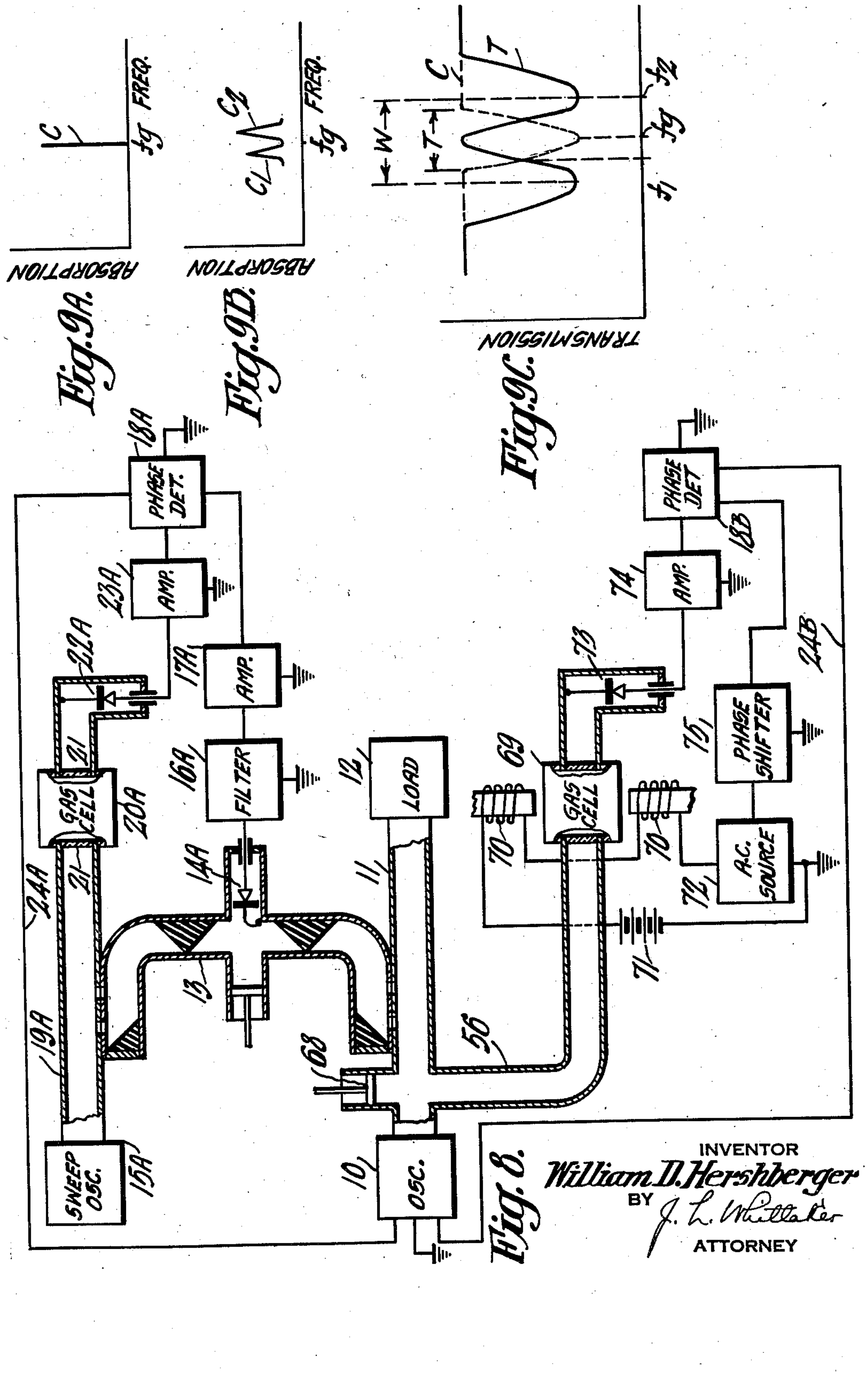

Figure 6 schematically illustrates a modification of the system of Figure 1 which utilizes the Stark effect;

Figure 7 is an explanatory figure referred to in discussion of one of the control systems of Figure 6;

Figure 8 illustrates a modification of Figure 1 using the Zeeman effect;

Figures 9A–9C are explanatory figures referred to in discussion of Figure 8.

In explanation of phenomena utilized for stabilization of frequency by the present invention, it is known there are a number of gases including $NH_3$, COS, $CH_3OH$, $CH_3NH_2$ and $SO_2$ which exhibit selective absorption in the microwave region of the frequency spectrum. From measurements of the molecular resonant frequency of such a gas, it is known that the magnitude of the absorption coefficient is quite independent of the gas pressure, but that the apparent width of the absorption line decreases substantially linearly with reduction of pressure; specifically, at a wavelength of 1.25 centimeters (24,000 megacycles), the Q of the ammonia line is approximately 10 when the gas pressure is $\frac{1}{10}$ of an atmosphere; is 100 at $^1/_{100}$ of an atmosphere, etc. However, as the pressure is further and further reduced to the order of 0.1 millimeter, the absorption line in the case of ammonia breaks up into a plurality of sharply defined component lines which precisely correspond with a particular frequency. At room temperature, with convenient sized gas containers, optimum Q is realized at a pressure of the order of 0.02 mm. of mercury. As shown in Figure 8 of my copending application Serial No. 4,497, filed January 27, 1948, even a relatively few gases provide a substantial number of precise frequency lines in that portion of the microwave region between 20.5 and 25 kilocycles.

In modifications of the invention herein specifically shown and described, this relation between the pressure of a gas and the width of its absorption line is utilized to provide two frequency standards having substantially different Q's which are respectively utilized in two frequency-stabilizing systems which jointly control the frequency of the oscillator to be stabilized.

Referring to Figure 1, the oscillator 10 to be stabilized is connected by a transmission path 11 to an antenna or other load generically represented by the block 12. The transmission path 11 which may be a waveguide, as shown, or a concentric line, is connected by one branch of a directional coupler 13B to a mixer 14B which may be a diode or preferably a crystal rectifier of the germanium or other type. Another branch of the directional coupler 13B, or equivalent, extends to a second transmission line 19B which connects a sweep oscillator 15B to a demodulator or rectifier 22B which may be a diode or crystal rectifier. A gas cell 20B is included in the transmission line 19B between the microwave sweep oscillator 15B and the rectifier 22B, the windows 21 of thin mica or the like serving to seal the gas within cell 20B and to permit transmission therethrough of the microwave energy from oscillator 15B. The gas within cell 20B is under low pressure, of the order of 0.02 millimeter or less, and consequently exhibits sharp molecular resonance represented by curve B of Figure 2. Accordingly, each time the frequency of oscillator 15B passes through the molecular resonant frequency of the gas in cell 20B, the demodulated output of rectifier 22B is a sharp pulse which after amplification by amplifier 23B is impressed upon one input circuit of a phase or coincidence-detector 18B.

Upon the other input circuit of the phase-comparator 18B is impressed a series of pulses each occurring as the beat frequency of the oscillators 10 and 15B passes through a selected value which may be zero, or a finite value, for example 30 megacycles. To obtain this second series of pulses, the output of the mixer 14B is impressed upon a low pass filter or intermediate frequency amplifier exemplified by the block 16B and the output thereof is amplified and demodulated by detector-amplifier 17B.

The direct-current output of the phase-detector varies in sense and amplitude with variations of the phase relations between the two series of pulses and is applied by line 24B to the oscillator 10 to minimize deviations of its frequency from the desired value. The control system thus far described is generally similar to that disclosed in my aforesaid copending application Serial No. 4,497 to which reference may be had for a more detailed description.

For purposes of the present invention, the repetition rate of the sweep oscillator 15B is relatively low, for example, 50 kilocycles, and the sweep range is relatively narrow, for example, 750 kilocycles; the Q of the gas cell 20B is relatively high, for example, 100,000; and the nominal time constant of the coincidence-detector 18B is relatively large, for example, 40 to 60 microseconds. The effective time constant is also relatively large and depends both on the nominal time constant determined by the C-R product of the filter and the loop gain on this part of the frequency control circuit $$\left(\frac{CR}{\mu}\right)$$

The control system including oscillator 15B, gas cell 20B and phase-comparator 18B is well suited to collect precise error information, but collects and utilizes it at relatively slow rate. Moreover, the range of frequency deviation for which this control system is effective is relatively narrow, i. e., of the order of 350 kilocycles, so that it is not operative when there exist large deviations of frequency of oscillator 10, as for example, during warming-up periods.

To provide a system which insures precise stabilization and which is effective over a wide range of deviation, there is additionally provided a second control system, generally similar to that above described except in respects specifically discussed. In general, the output of a second sweep oscillator 15A is transmitted by a suitable line 19A through a second gas cell 20A to a demodulator or rectifier 22A. The pulse output of demodulator 22A is amplified by amplifier 23A and impressed upon one input circuit of phase-detector 18A. The repetition rate of these pulses corresponds with the sweep rate of oscillator 15A. Pulses of the same repetition rate are impressed upon the other input circuit of the phase-detector in the output circuit of the filter or intermediate frequency amplifier 16A by amplifier 17A. To produce this second series of pulses, the output frequencies of the oscillators 10 and 15A are mixed by the rectifier 14A and the resulting periodically varying beat frequency is impressed upon the filter 16A for selection of the pre-chosen beat frequency.

As thus generally described, the components and operation of the two control systems are similar: however, the sweep oscillator 15A of the second control system has a relatively high sweep rate, for example 1 megacycle per second, and a relatively wide sweep range, for example, 15 megacycles; the Q of the gas cell is relatively low, for example, 5,000; and the nominal time constant of the phase-detector is relatively small, for example, 2 or 3 microseconds. Its effective time constant depends both on the nominal time constant and the loop gain in this portion of the frequency control circuit. Accordingly, this second control system is suited rapidly to collect and utilize frequency-error information and is effective for large deviations, for example, 5 megacycles, of the mean-carrier frequency of oscillator 10.

Accordingly, the unidirectional output voltage of the phase-detector 18A as applied by control line 24A is effective to maintain coarse stabilization of the frequency of oscillator 10. In the particular example given, the second stabilizing system is effective to stabilize the frequency of oscillator 10 to within ½ megacycle and the stabilizing system is thus protected against the effect of modulating frequencies which approach 1 megacycle, the search rate of oscillator 15A. With oscillator 10 roughly stabilized, the burden of maintaining precise frequency despite large deviations is removed from the first control system, which as above described, is constructed to collect high-quality error information but at a necessarily low search rate.

Thus, the two control systems jointly provide a stabilizing control which is effective over a wide range of frequency-deviation and over a wide rate of change of frequency.

As shown in Figure 2, the same gas line may be used as a standard of frequency in the cells 20A and 20B, that is, the center frequency of the broad resonant characteristic of cell 20A may coincide with the center frequency of the sharp resonance curve B of the high Q gas cell 20B. However, different lines of the same gas or different lines of different gases may be used as frequency standards by proper selection of the frequencies respectively passed by the filters 16A and 16B.

The stabilizing voltages produced by the two complementary control systems may be applied in any known manner to control the frequency of oscillator 10 which may be a Klystron, magnetron or other microwave generator and two stabilizing voltages may be applied between different pairs of electrodes of the tube or may be applied effectively in series between a pair of electrodes. For example, as shown in Figure 3, in which the microwave generator is a reflex Klystron 30 having a reflex anode 31, a cathode 32 and a cavity electrode 33 including spaced grids, the error voltage $E_A$, for effecting coarse stabilization of frequency may be applied between the anode 31 and the cathode 32 and the error voltage $E_B$ for effecting precise stabilization of frequency may be applied between the cavity electrode 33 and the cathode 32, the selection of the electrodes between which the error voltages are applied being largely a matter of choice involving factors not of prime concern here. The modulating voltage $E_S$ for varying the carrier frequency in accordance with audio or video intelligence may be applied in any known manner as by transformer 34 having a secondary winding in circuit with the cathode 32 of the tube.

When the microwave generator is a multicavity Klystron 38, such as shown in Figure 4, the frequency stabilizing voltages $E_A$ and $E_B$ may be respectively applied to auxiliary accelerating electrodes 42 and 43 interposed in the path of the electron beam from cathode 44 to the collector electrode 45. The auxiliary electrode or electrodes are in advance of the cavities 39 and 40, which in accordance with known practice, are coupled by a feedback loop 41.

As illustrative of an arrangement suited to produce a unidirectional control voltage from the pairs of impulses respectively corresponding with the outputs of gas cell 20A or 20B and the associated filter 16A or 16B, reference is made to Figure 5 in which the tube 51 is a dual tube of the screen grid type. To the screen grids of the tube, for example, may be applied sawtooth waves having the same repetition frequency as the sweep oscillator 15A or 15B and which may be produced by a sawtooth generator such as shown in Figure 6 of copending application Serial No. 8,246 filed February 13, 1948. To the control grids of tube 51 may be applied positive and negative pulses, each pair corresponding with a pulse from the associated gas cell or filter. The single train of pulses may be converted to positive and negative pulses by an arrangement such as shown in Figure 5 of the aforesaid application Serial No. 8,246 filed February 13, 1948. The phasing or coincidence relations of the pulses respectively applied to the control grids and to the screen grids of tube 51 determines the sense and magnitude of the variations in amplitude of the anode current of the tube traversing the the cathode resistor 52. The magnitude of this resistor and of the associated condenser 53 determines the time constant of the phase-detector 18A (or 18B) including tube 51. It should be noted, however, that the effective time constant of the phase-detector also depends upon the amplification of the output of the demodulator 22A or 22B, the greater the amplification the shorter the effective time constant.

An alternative and sometimes preferred embodiment of the phase-detector could employ the tube 33 and the four diodes of the circuits 32, 34 described on pages 8 and 9 illustrated in Figure 1 of applicant's copending application, Serial No. 4,497 filed January 27, 1948.

In the system shown in Figure 1, the two control systems of the dual stabilizing arrangement are similar in that each includes a sweep oscillator, a gas cell—or equivalent frequency standard, a filter and a phase-detector. In the systems shown in Figures 6 and 7, the two stabilizing systems are dissimilar in that in only one of the stabilizing systems is there scanning of a fixed gas line by a sweep oscillator. In one of the stabilizing systems of each of Figures 6 and 8, the gas line is periodically shifted as by utilization of the Stark effect (Figure 6) or the Zeeman effect (Figure 8).

Referring to Figure 6, the error voltage for effecting precise stabilization of the frequency of oscillator 10 is derived, as in the system of Figure 1, by an arrangement including the sweep oscillator 15B having a low repetition rate and a narrow frequency sweep, a high Q frequency standard, such as gas cell 20B, and a coincidence detector 18B having a large time constant. This control system of Figure 6 at low rate collects and utilizes high quality error information. For collection and utilization at high rate of low-quality error information suited for coarse stabilization, there is utilized a control system which, per se, is generally similar to one disclosed and claimed in my copending application Serial No. 5,563, filed January 31, 1948.

Reverting to Figure 6 hereof, part of the output of the oscillator 10 is transmitted as by wave-guide or concentric line 56 to and through a pair of gas cells 57—58. The gas in each of these cells is at relatively high pressure, of the order of 0.2 millimeter and so exhibits broad molecular resonance. For the purpose of providing control impulses whose phase or time relation is a function of the frequency deviation of oscillator 10, the gas cells 57 and 58 are respectively provided with Stark electrodes 59 and 60 to which are applied modulating potentials which correspondingly displace the broad molecular resonant frequency characteristic of the gas within each of the cells. Each of the Stark electrodes, which may be in the form of a rod or plate, is electrically insulated from the guide walls and is connected to a source 61 of alternating voltage, the potentiometer or voltage divider 62, or equivalent, providing for selection of the desired magnitudes of the potentials applied to the Stark electrodes. The frequency of the source 61 is high compared to the repetition frequency of the sweep oscillator 15B and the magnitude of the modulating potential applied to the Stark electrodes is such that the ranges of frequency swept by the gas reference lines is much greater than the range of frequencies swept by oscillator 15B.

Curve C of Figure 7 which represents the normal resonant response of the gas itself, indicates that maximum absorption occurs when the frequency of the impressed microwave energy corresponds with the normal molecular resonant frequency $f_g$ of the gas. Curve D of Figure 7 represents the demodulated output of cell 57 upon simultaneous application of the microwave frequency field and the Stark field, whereas curve E represents the corresponding side-band amplitude of the output of cell 58. These two side-band amplitude curves have a cross-over point at frequency $f_0$ which is the operating frequency of the system at which the "coarse" stabilizing system tends to stabilize the frequency of oscillator 10. By choice of the selected gas line of cell 20B and the pass frequency of filter 16B, the frequency $f_0$ of the coarse stabilizing system may be made to correspond with the frequency at which the "fine" stabilizing system effects stabilization. The filters 16C and 16D, which may be resonant cavities, are effective to pass energy at frequencies in the neighborhood of $f_0$ and to suppress transmission of frequencies in the neighborhood of $f_g$. The outputs of the rectifiers 63 and 64, preferably after amplification by amplifiers 65 and 66, are impressed upon the input circuits of a phase-detector 18A of suitable type.

As in the system shown, the potential applied to the Stark electrodes 59, 60 has no unidirectional component, the energy from oscillator 10 as transmitted through the gas cells 57 and 58 is modulated at twice the frequency of oscillator 61; namely at 200 kilocycles in the specific example given. Accordingly, for phase-comparison purposes, a frequency double 67 is interposed between the oscillator 61 and the phase-shift detector 18A. When the frequency of oscillator 10 departs from the frequency $f_0$ in one sense or the other, the unidirectional output voltage of the phase-detector 18A correspondingly varies in sense and amplitude and as applied to oscillator 10 tends to reduce the deviation.

The complete system of Figure 6, like that of Figure 1, provides two complementary control systems, one of which at high rate collects and utilizes low quality error information effective to maintain the frequency of oscillator 10 within a range for which a second control system, which at low rate collects and utilizes high-quality error information, is effective.

It shall be understood that the control system of Figure 6 which utilizes the Stark effect may be used to effect precise frequency control and that the other control system utilizing the sweep oscillator 15B and gas cell 20B may be utilized to effect the coarse stabilizing control; in such case, of course, the oscillator 15B will have a high repetition rate and a wide frequency sweep and the gas cell 20B will have a broad resonance characteristic. Also, of course, the interrogation rate of the oscillator 61 will be decreased and the modulating potentials applied to the Stark electrodes shall be of lower magnitudes. The former system in which the Stark effect is used for coarse stabilization is however to be preferred.

Before specific discussion of the dual system of Figure 8 which utilizes the Zeeman effect in one of the control systems, it is pointed out that when a strong magnetic field is applied to a cell containing gas at low pressure, the normal absorption line C, Figure 9A, is subject to displacement which varies as regards sign, mode and other characteristics upon the particular gas and the selected absorption line thereof. For sake of definiteness, the 3, 3, line of $NH_3$ (23870.1 megacycles) upon application of a magnetic field splits into two lines, $C_1$, $C_2$, Figure 9B, symmetrically located with respect to the original line position. The splitting is linear and each component line moves 720 kilocycles per 1,000 gauss of the applied magnetic field. Actually only the main component lines are shown and the "Satellite" lines, due to the quadruple moment of the $N^{14}$, which are similarly effected are not shown. The "Satellites" may be ignored as their amplitude is only of the order of three per cent of the main lines.

Accordingly, the transmission characteristic T of a gas cell to which a strong magnetic field is applied is generally similar to that shown in Figure 9C and is characterized by a "window" W centered on the absorption line frequency $f_g$. When the magnetic field includes a large alternating component, the transmission characteristic periodically shifts from curve T having a "window" W to one having a "shutter" T, both the window and shutter being centered on frequency $f_g$ and having cross-over points at frequencies $f_1$ and $f_2$ respectively slightly above and below the frequency $f_g$. When the field has a relatively small alternating component, the "window" W remains open but varies in width at twice the field frequency. Depending upon the frequency of the alternating component of the magnetic field, the resulting modulation envelope of the output of rectifier 73 may be utilized to obtain a coarse or fine frequency stabilization. For purpose of explanation of Figure 8, it will be assumed the control system utilizing the Zeeman effect is for obtaining a precise or fine frequency control within the broader frequency limits maintained by the other stabilizing system.

The control system for effecting coarse stabilization of frequency includes the sweep oscillator 15A which at high rate sweeps over a wide band of frequencies including the frequency for which the gas in cell 20A is broadly resonant and also the frequency which jointly with oscillator 10 produces a beat frequency passed by the filter or intermediate frequency amplifier 16A. Inasmuch as this system has been quite fully described in discussion of Figure 1, repeated explanation thereof appears unnecessary.

The fine frequency control system utilizing the Zeeman effect includes a gas cell 69 containing at low pressure a gas having a molecular resonant frequency $f_g$ which corresponds with the desired operating frequency of oscillator 10. Microwave energy from oscillator 10 is transmitted to the gas by a waveguide or concentric line 56; the tuning stub 68 preferably being provided to match the impedance of this branch line to that of transmission line 11 which extends to the load 12. The gas within the cell 69 is subjected to the strong magnetic field produced by coils 70, 70, the unidirectional component of the field being supplied by a direct-current source exemplified by battery 71, and the alternating or modulating component of the field being supplied by a generator or oscillator 72 of suitably low frequency for example 30 cycles. The output of rectifier 73 of the diode or crystal rectifier type disposed in transmission line 56 and the gas cell 69 is impressed after amplification and demodulation by detector-amplifier 74 upon one input circuit of a phase-detector 18B. The phase-shifter 75 interposed between the source 72 and the other input circuit of phase-detector 18B is so adjusted that when the operating frequency of oscillator 10 corresponds with frequency $f_g$, the unidirectional output of the phase-shift detector 18B is zero. When the operating frequency is higher or lower than frequency $f_g$, the phase of the demodulated output of the gas cell 73 is advanced or retarded with respect to the output of phase-shifter 75. The unidirectional output voltage of the phase-detector which is applied by line 24B to oscillator 10 therefore varies in sense and magnitude with the frequency deviation of oscillator 10 and is applied in proper sense to minimize such deviation.

A frequency control system utilizing the Zeeman effect is more fully described and claimed per se in my copending application Serial No. 58,295, filed November 4, 1948.

It shall be understood the invention is not limited to the specific systems illustrated and described in explanation of the invention and the modifications and changes may be made within the scope of the appended claims. For example, and particularly for control of oscillators operating at lower frequencies, reference standards other than a gas line may be utilized, the significant points being that in the system for effecting coarse stabilization, the frequency standard shall have a low Q and that the frequency standard utilized for precise stabilization shall have a high Q. Furthermore, it shall be understood that gas lines may be used as frequency standards of low frequency oscillators by recourse to the techniques disclosed in copending applications Serial Nos. 6,975 and 8,246.

What is claimed is:

1. The method of precisely stabilizing the frequency of an oscillator which comprises coarsely stabilizing the frequency within a wide-band by the steps of rapid collection and utilization of frequency-error information derived from repeated comparison at high sampling rate of the oscillator frequency with the resonant frequency of a frequency standard, and precisely stabilizing the frequency within a narrow band of frequencies by the steps of slow collection and utilization of additional frequency-error information derived from repeated comparison at low sampling rate of the coarsely stabilized oscillator frequency with the resonant frequency of a frequency standard.

2. The method of precisely stabilizing the frequency of an oscillator which comprises coarsely stabilizing the frequency within a wide-band by the steps of rapid collection and utilization of frequency-error information derived from repeated comparison at high sampling rate of the oscillator frequency with the resonant frequency of a low Q standard, and precisely stabilizing the frequency within a narrow band of frequencies by the steps of slow collection and utilization of additional frequency-error information derived from repeated comparison at low sampling rate of the coarsely stabilized oscillator frequency with the resonant frequency of a high Q standard.

3. The method of stabilizing the frequency of an oscillator which comprises collecting frequency-error information by repeated comparison at high sampling rate of the frequency of the oscillator with the resonant frequency of a low Q gas standard, rapidly utilizing the aforesaid error-information for coarse stabilization of the oscillator frequency, collecting additional frequency-error information by repeated comparison at low sampling rate of the frequency of the coarsely stabilized oscillator with the resonant frequency of a high Q gas standard, and slowly utilizing said additional error-information for precise stabilization of the oscillator frequency.

4. The method of stabilizing the frequency of an oscillator which comprises varying the frequencies of two sweep oscillators respectively over a wide band of frequencies at high repetition rate and over a narrow band of frequencies at low repetition rate, impressing the outputs of said wide and narrow band sweep-oscillators upon circuit elements resonant within said bands and respectively having low and high Q's, utilizing the energy passed by the low Q circuit element to effect rapid, coarse stabilization of the frequency of the first-named oscillator, and utilizing the energy passed by the high Q circuit element to effect slow, precise stabilization of the first-named oscillator.

5. The method of stabilizing the frequency of an oscillator which comprises varying the frequencies of two sweep oscillators respectively over a wide band of frequencies at high repetition rate and over a narrow band of frequencies at low repetition rate, impressing the outputs of said wide and narrow band oscillators upon bodies of gas respectively exhibiting blunt and sharp molecular resonances within said bands of frequency, utilizing the energy passed by the gas exhibiting blunt molecular resonance to effect rapid, coarse stabilization of the frequency of the first-named oscillator, and utilizing the energy passed by the gas exhibiting sharp molecular resonance to effect slow, precise stabilization of the frequency of the first-named oscillator.

6. The method of stabilizing the frequency of an oscillator which comprises at high repetition rate repeatedly varying the frequency of a sweep oscillator over a wide frequency range, impressing the output of said sweep oscillator upon a body of gas exhibiting blunt molecular resonance to produce a series of pulses having high repetition rate, producing a second series of pulses of the same high repetition rate each occurring as the difference between the frequencies of said oscillators passes through a predetermined value, roughly stabilizing the frequency of said first-named oscillator to minimize variation of the phase-difference between the aforesaid two series of rapidly recurrent pulses, at low repetition rate repeatedly varying the frequency of a second sweep oscillator over a narrow frequency range, impressing the output of said second sweep oscillator upon a body of gas exhibiting sharp molecular resonance to produce a series of pulses having low repetition rate, producing a second series of pulses of the same low repetition rate each occurring as the difference between the frequencies of said oscillators passes through a predetermined value, and controlling the roughly-stabilized frequency of said first-named oscillator to minimize the phase-difference between said last-named two series of pulses.

7. The method of stabilizing the frequency of an oscillator which comprises impressing energy from a sweep oscillator upon a body of gas exhibiting molecular resonance, mixing the outputs of said oscillators to produce a periodically varying beat frequency, controlling the first-named oscillator in response to departures from a predetermined timed relation of pulses respectively occurring as the sweep oscillator frequency passes through the molecular resonance of said gas and as said beat frequency passes through a predetermined value, applying output energy of the controlled oscillator to a second body of gas exhibiting molecular resonance, applying an alternating field to said second body of gas periodically to vary its molecular resonance frequency and to modulate the oscillator energy transmitted through the gas, demodulating the energy transmitted through said second body of gas, and additionally controlling said first-named oscillator in response to departures from a predetermined phase relation between said demodulated energy and the exciting source of said alternating field.

8. The method of stabilizing the frequency of an oscillator which comprises impressing energy from a sweep oscillator upon a body of gas exhibiting molecular resonance, mixing the outputs of said oscillators to produce a varying beat frequency, controlling the first-named oscillator in response to departures from a predetermined timed relation of pulses respectively occurring as the sweep frequency passes through the molecular resonant frequency of said gas and as said beat frequency passes through a predetermined value, applying energy from the controlled oscillator to a second body of gas exhibiting molecular resonance, applying an alternating electric field to said second gas periodically to vary its molecular resonance frequency and to modulate the oscillator energy being transmitted by the second gas, demodulating the energy transmitted through said second body of gas, and additionally controlling said first-named oscillator in response to departures from a predetermined phase relation between said demodulated energy and the exciting source of said electric field.

9. The method of stabilizing the frequency of an oscillator which comprises impressing energy from a sweep oscillator upon a body of gas exhibiting molecular resonance, mixing the outputs of said oscillators to produce a varying beat frequency, controlling the first-named oscillator in response to departures from a predetermined timed relation of pulses respectively occurring as the sweep frequency passes through the molecular resonant frequency of said gas and as said beat frequency passes through a predetermined value, applying energy from the controlled oscillator to a second body of gas exhibiting molecular resonance, applying an alternating magnetic field to said second gas periodically to vary its molecular resonance frequency and to modulate the oscillator energy being transmitted by the second gas, demodulating the energy transmitted through said second body of gas, and additionally controlling said first-named oscillator in response to departures from a predetermined phase relation between said demodulated energy and the exciting source of said magnetic field.

10. A system for stabilizing the frequency of an oscillator comprising phase-comparators respectively having small and large time-constants, electrical means for rapidly supplying frequency-error information to the small time-constant phase-comparator including a low Q frequency standard, electrical means for slowly supplying frequency-error information to the large time-constant phase-comparator including a high Q frequency standard, and means for controlling the frequency of said oscillator jointly in accordance with the concurrent outputs of said phase-comparators.

11. An arrangement for stabilizing the frequency of an oscillator comprising two complementary control systems each including a sweep oscillator, a gas cell exhibiting molecular resonance and responsive to signals from said oscillator, a mixer upon which is impressed the outputs of the sweep oscillator and the first-named oscillator, and a phase-comparator upon which is impressed the demodulated outputs of said gas-cell and said mixer: the sweep oscillator, gas cell and phase-comparator of one of said systems respectively having a substantially wider band sweep, a substantially blunter resonance characteristic and a substantially smaller time-constant than the corresponding components of the other of said control systems.

12. A system for stabilizing the carrier frequency of an oscillator comprising two gas cells exhibiting blunt and sharp molecular resonances respectively, two sweep oscillators, modulating means for varying at high repetition rate the frequency of one of said sweep oscillators over a wide band of frequencies including the blunt resonant frequency of one of said gas cells, modulating means for varying at low repetition rate the frequency of the other of said sweep oscillators over a narrow band of frequencies including the sharp resonant frequency of the other of said gas cells, control means utilizing the output of the bluntly resonant gas cell to effect coarse control of said carrier frequency to bring it within said wide band of frequencies, and control means utilizing the output of the sharply resonant gas cell to effect precise control of the coarsely controlled carrier frequency to bring it within said narrow band of frequencies.

13. An arrangement for stabilizing the carrier frequency of an oscillator comprising two control systems for respectively collecting frequency-error information at high and low repetition rates and applying it to phase-comparators respectively having small and large time-constants, one of said control systems including a gas cell exhibiting molecular resonance at a fixed frequency and a sweep oscillator repeatedly scanning a range of frequencies including the resonant frequency of said gas and the operating frequency of said first-named oscillator, and the other of said control systems including a gas cell with a Stark electrode, and means for periodically varying the potential of the Stark electrode to sweep the molecular resonant frequency of the second-named gas cell over a range of frequencies including the desired operating frequency of the first-named oscillator.

14. An arrangement for stabilizing the mean carrier frequency of a frequency-modulated oscillator comprising two control systems for respectively collecting frequency-error information at high and low repetition rates and applying it to phase-comparators respectively having small and large time-constants, one of said control systems including a gas cell exhibiting molecular resonance at a fixed frequency and a sweep oscillator repeatedly scanning a range of frequencies including the resonant frequency of said gas, and the other of said control systems including a gas cell, electromagnetic means in whose field said cell is disposed, and means for repeatedly varying the alternating component of said field to sweep the molecular resonant frequency of said second-named gas cell over a range of frequencies including the desired operating frequency of said first-named oscillator.

15. Apparatus for precisely stabilizing the frequency of an oscillator including a first frequency standard, means for deriving frequency-error information by repeated comparison at high sampling rate of the oscillator frequency with the resonant frequency of said first frequency standard, means for coarsely stabilizing the frequency of said first oscillator within a relatively wide frequency band in response to said frequency-error information, a second freqency standard having a relatively higher Q than said first standard, means for deriving additional frequency-error information from repeated comparison at low sampling rate of the coarsely stabilized oscillator frequency with the resonant frequency of said second frequency standard, and means for precisely stabilizing said oscillator frequency in response to said additional frequency-error information.

16. Apparatus according to claim 15 wherein said frequency standards include cells containing gas exhibiting molecular resonance, said cells respectively enclosing gas at relatively widely differing gas pressures.

17. Apparatus according to claim 15 wherein at least the second of said frequency standards includes a cell containing gas exhibiting molecular resonance, the said gas within the cell of said second standard being at sufficiently low pressure to provide highly selective microwave absorption at a discrete microwave resonance frequency of said gas.

WILLIAM D. HERSHBERGER.

REFERENCES CITED

The following references are of record in the file of this patent:

UNITED STATES PATENTS

| Number | Name | Date |
|---|---|---|
| 2,232,390 | Katzin | Feb. 18, 1941 |
| 2,284,266 | De Bellescize | May 26, 1942 |
| 2,410,817 | Ginzton | Nov. 12, 1946 |
| 2,425,922 | Crosby | Aug. 19, 1947 |